United States Patent
Magno, Jr. et al.

(10) Patent No.: US 9,341,285 B2
(45) Date of Patent: May 17, 2016

(54) CABLE CLIP

(71) Applicant: Thomas & Betts International, LLC, Wilmington, DE (US)

(72) Inventors: Joey D. Magno, Jr., Cordova, TN (US); Randy Dorn, Fullerton, CA (US); Garrett Gauvain, Laguna Beach, CA (US)

(73) Assignee: Thomas & Betts International LLC, Wilmington, DE (US)

( * ) Notice: Subject to any disclaimer, the term of this patent is extended or adjusted under 35 U.S.C. 154(b) by 0 days.

(21) Appl. No.: 13/969,224

(22) Filed: Aug. 16, 2013

(65) Prior Publication Data

US 2014/0061396 A1    Mar. 6, 2014

Related U.S. Application Data

(60) Provisional application No. 61/695,102, filed on Aug. 30, 2012.

(51) Int. Cl.
| | |
|---|---|
| *F16L 3/10* | (2006.01) |
| *H02G 3/32* | (2006.01) |
| *F21V 21/08* | (2006.01) |
| *A47G 29/08* | (2006.01) |

(52) U.S. Cl.
CPC .. *F16L 3/10* (2013.01); *H02G 3/32* (2013.01); *A47G 29/083* (2013.01); *F21V 21/08* (2013.01)

(58) Field of Classification Search
CPC ............... F16L 3/10; F16L 3/24; F16L 3/26; F16L 3/22; F16L 3/223; H02G 3/263; H02G 3/32; F21V 21/08; A47G 29/083
USPC ............... 248/72, 73, 74.1, 74.2, 74.5, 228.7, 248/231.81
See application file for complete search history.

(56) References Cited

U.S. PATENT DOCUMENTS

| | | | | |
|---|---|---|---|---|
| 1,425,089 | A | * | 8/1922 | Henry .............................. 24/3.6 |
| 2,109,213 | A | | 2/1938 | Fearing |
| 2,332,855 | A | | 10/1943 | Jones |
| 2,450,147 | A | | 9/1948 | Lawry |
| 2,657,442 | A | | 11/1953 | Bedford |
| 3,113,754 | A | | 12/1963 | Jansson |

(Continued)

FOREIGN PATENT DOCUMENTS

| | | |
|---|---|---|
| CA | ID134530 | 10/2010 |
| CA | ID134531 | 10/2010 |

(Continued)

OTHER PUBLICATIONS

Canadian Office Action dated Jan. 20, 2015 for Application No. 2,824,260.

*Primary Examiner* — Anita M King
(74) *Attorney, Agent, or Firm* — Hoffmann & Baron, LLP

(57) ABSTRACT

A cable clip is provided for mounting cables onto solar modules. The cable clip is a one piece assembly that is comprised of two main sections: a first recess for clipping onto a solar module and a second recess for receiving a cable from a solar module. The cable clip may be designed in either a parallel or perpendicular configuration which gives installers of solar modules maximum flexibility when mounting cables onto modules. A multi-level clip is also described for cases when a multitude of cables are required to be mounted onto a solar module.

21 Claims, 8 Drawing Sheets

(56) References Cited

U.S. PATENT DOCUMENTS

| | | | |
|---|---|---|---|
| 3,204,313 A * | 9/1965 | See | 24/557 |
| 3,228,640 A * | 1/1966 | Wolsh | 248/72 |
| 3,231,076 A * | 1/1966 | Freiman | 206/585 |
| 3,564,668 A * | 2/1971 | Kirk | 281/30 |
| 3,626,553 A * | 12/1971 | Goodbrand et al. | 280/814 |
| 3,983,602 A * | 10/1976 | Barry | 24/11 R |
| 4,527,759 A | 7/1985 | Dorner et al. | |
| 4,826,078 A | 5/1989 | Arvin et al. | |
| 5,127,577 A | 7/1992 | Lynch, Jr. et al. | |
| 5,148,981 A | 9/1992 | Lynch, Jr. et al. | |
| 5,188,318 A | 2/1993 | Newcomer et al. | |
| D334,134 S | 3/1993 | Newcomer et al. | |
| 5,463,189 A | 10/1995 | Deneke et al. | |
| 5,820,095 A * | 10/1998 | Stone | 248/316.7 |
| 5,829,103 A * | 11/1998 | Allen | 24/11 R |
| 5,867,874 A * | 2/1999 | Simpson | 24/336 |
| 6,477,744 B1 * | 11/2002 | Miles | 24/3.12 |
| 6,484,365 B1 | 11/2002 | Thompson | |
| 7,915,536 B1 | 3/2011 | Hackett | |
| 7,997,773 B2 | 8/2011 | Kraus et al. | |
| 8,545,041 B2 * | 10/2013 | Brown | 362/191 |
| 2012/0192925 A1 | 8/2012 | Grushkowitz et al. | |

FOREIGN PATENT DOCUMENTS

| | | |
|---|---|---|
| CA | ID139669 | 11/2011 |
| CA | ID142146 | 4/2012 |
| CA | ID142147 | 4/2012 |
| CA | ID142148 | 4/2012 |
| EP | 1 931 006 A1 | 6/2008 |
| EP | 2235417 A1 | 10/2010 |
| FR | 2 089 473 | 1/1972 |
| FR | 2439350 | 5/1980 |
| WO | WO 2010/128375 | 11/2010 |
| WO | WO 2011/096043 | 11/2011 |
| WO | WO 2012/028301 | 3/2012 |

* cited by examiner

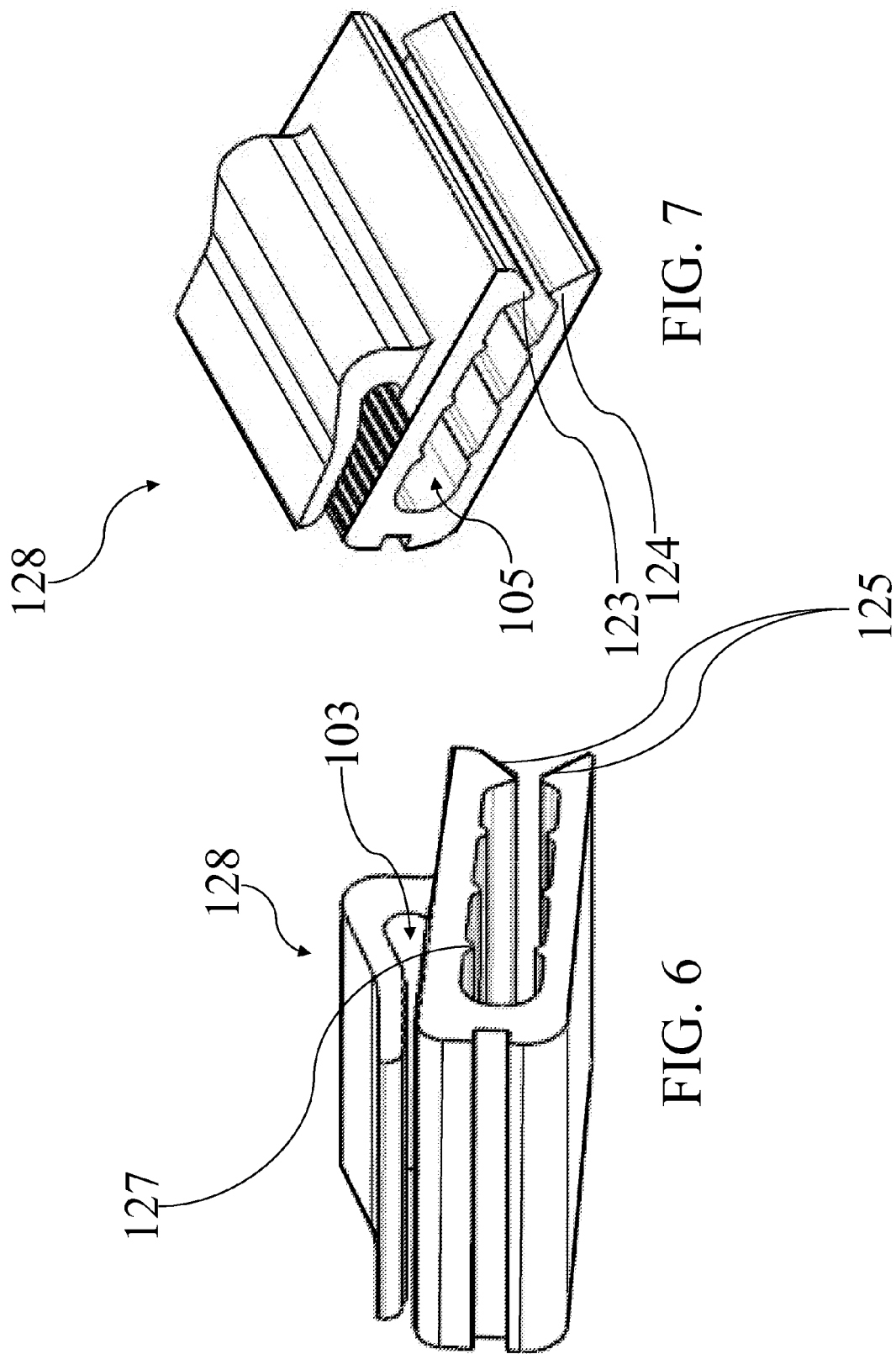

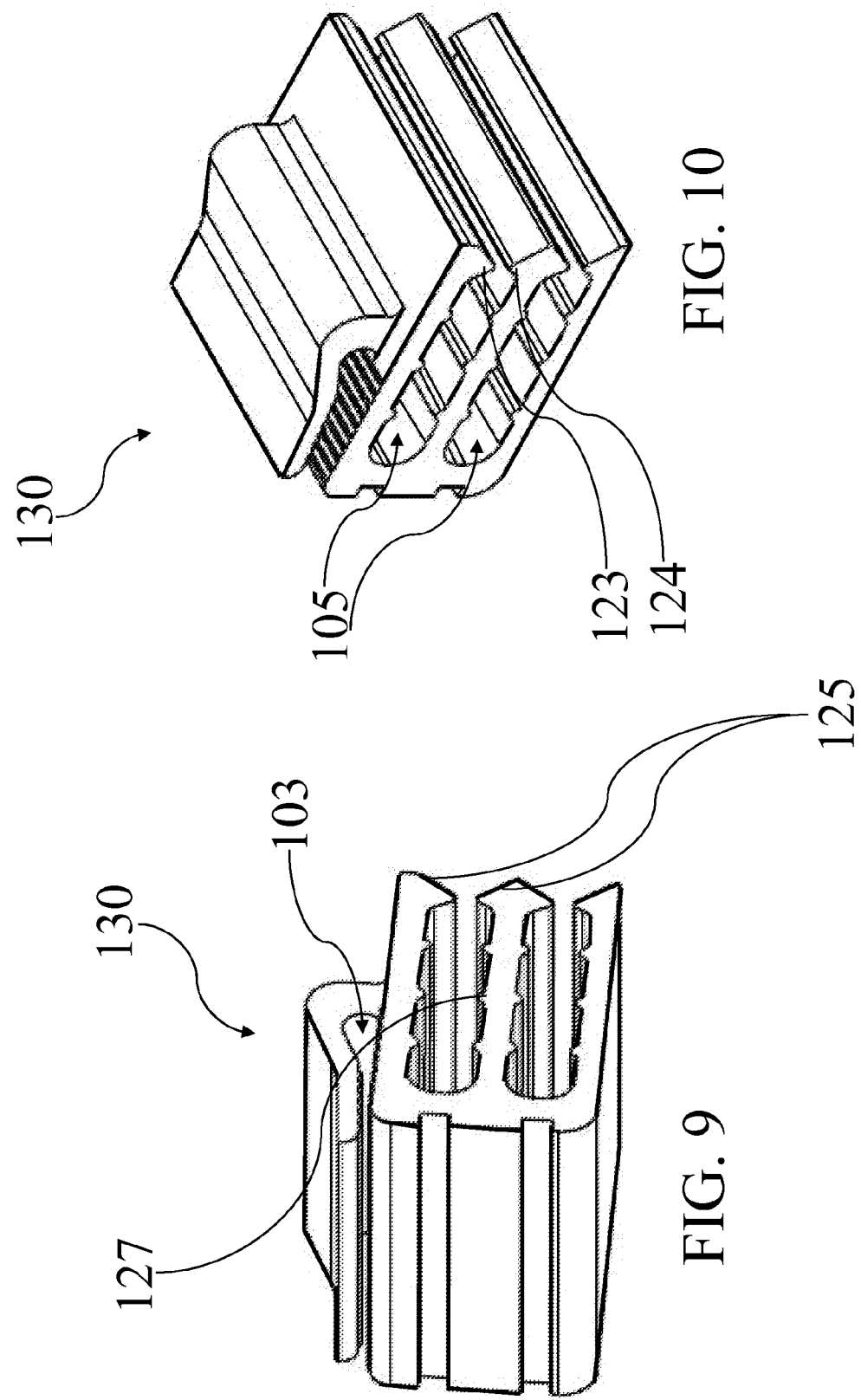

CABLE CLIP

FIELD OF THE INVENTION

In general, the present invention relates to a cable clip for mounting cables onto solar modules. The cable clip is a one piece clip which is comprised of a toothed recess for clipping onto the edge of a solar module and another recess which is oriented perpendicular or parallel to the toothed recess and which receives one or more cables for connecting two or more solar modules.

BACKGROUND

In the installation of solar modules, it is common for many modules to be connected in series resulting in "strings" of solar modules. Each solar module has a junction box with a cable extending outwards from each side of the module, and the cables have connectors to allow them to connect with other cables that extend from adjacent solar modules, which allow a series or "string" of solar modules to be connected. Extra length is often provided for the cables to allow for different spacing of modules while still allowing the cables enough length to connect with the adjacent module's cable connector. Designers and installers of solar modules prefer to have the modules installed as close as possible to one another to save space which, in turn, results in sagging cables. Some solutions to this problem of sagging cables do currently exist. One solution is to drill a hole in the edge of the module in order to loop the sagging cable through the hole, but this requires extra time and work on the part of the installer. Another solution is to provide a clip that has a cable tie attached to it. This often results in twisted cables. Additionally, these multi-piece clips are expensive to manufacture. A better solution is needed for the management of solar module cables.

SUMMARY OF THE INVENTION

The present invention provides a clip for mounting cables onto solar modules. The clip comprises two recessed sections which can be perpendicular or parallel to one another. One of the recessed sections clips onto the edge of a solar module, and the other section receives at least one cable which is run from the solar module. Though comprised of multiple sections, the cable clip is constructed as a one piece assembly, which saves on manufacturing costs. The perpendicular or parallel arrangement of the recessed sections of the cable clip allows for the cables of the solar module to be run perpendicular or parallel to the solar module, depending on the orientation preferred by the installer, which allows for easy connection to the adjacent solar modules and reduces the effects of twisted and sagging cables.

BRIEF DESCRIPTION OF THE DRAWINGS

FIG. 6 is a front perspective view of a parallel configuration cable clip for mounting cables onto solar modules of the present invention.

FIG. 7 is a top perspective view of a parallel configuration cable clip for mounting cables onto solar modules of the present invention.

FIG. 9 is a front perspective view of a multi-level cable clip for mounting cables onto solar modules of the present invention.

FIG. 10 is a top perspective view of a multi-level cable clip for mounting cables onto solar modules of the present invention.

DETAILED DESCRIPTION OF THE PREFERRED EMBODIMENT(S)

Figure 1:
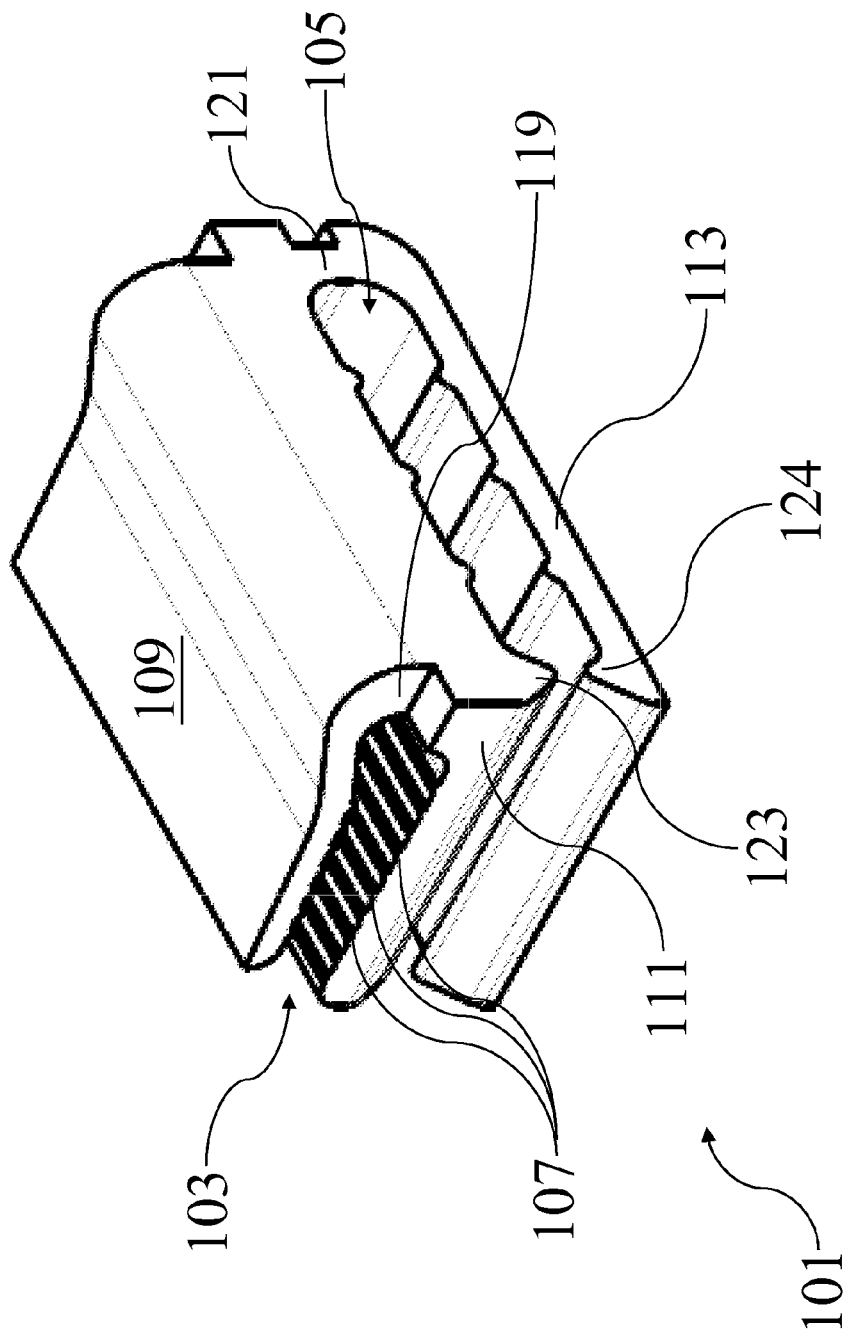
FIG. 1 is a top perspective view of a perpendicular configuration cable clip for mounting cables onto solar modules of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 2:
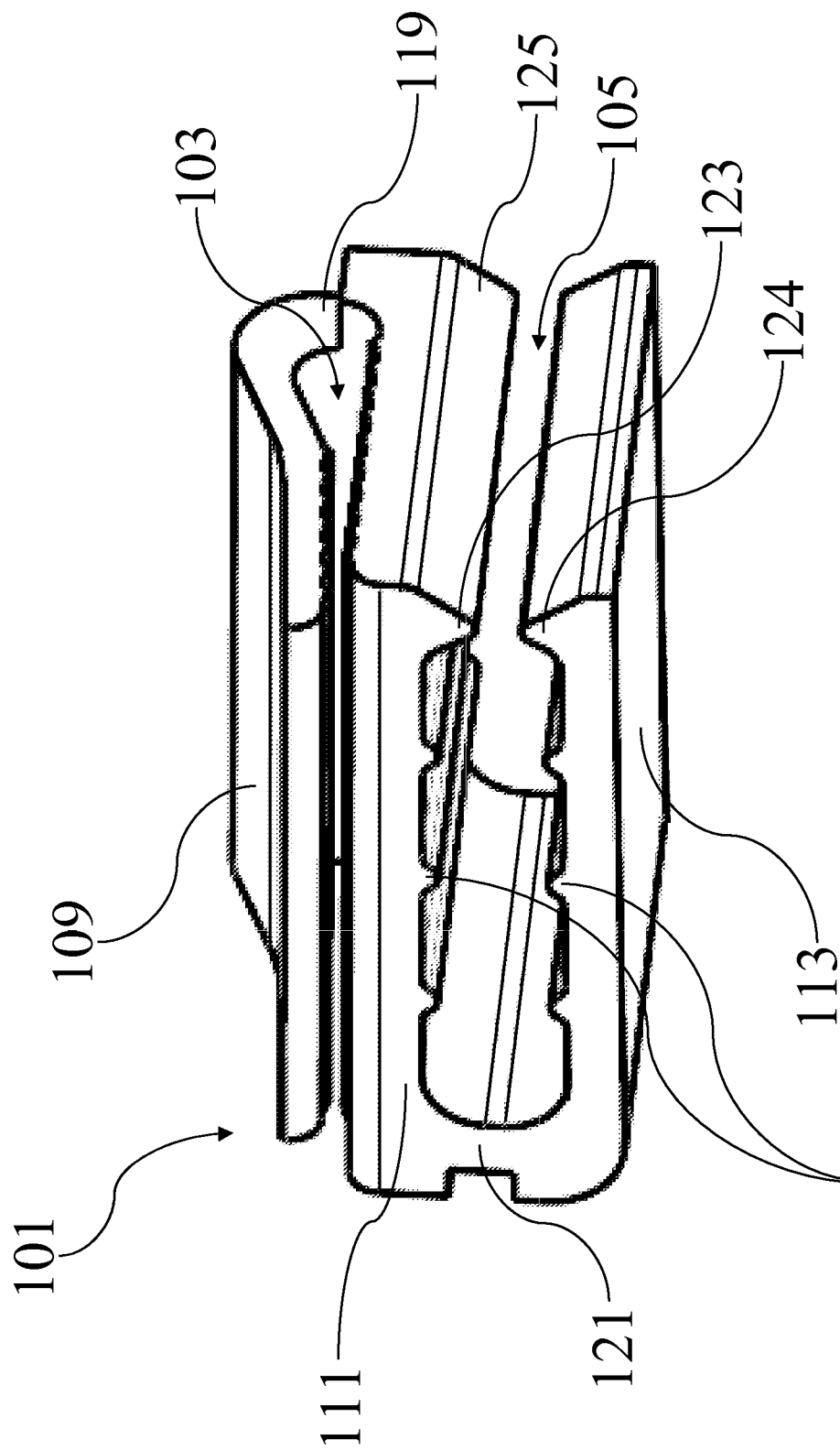
FIG. 2 is a side perspective view of a perpendicular configuration cable clip for mounting cables onto solar modules of the present invention.

Shown in FIGS. 1 and 2 are a top perspective view and a side perspective view, respectively, of a cable clip 101 for mounting cables onto solar modules of the present invention. The cable clip 101 may be mounted onto the frame of a framed solar module or directly onto the edge of a frameless solar module. The cable clip 101 is comprised of two main sections: a first recess 103 for clipping on to the edge of a solar module and a second recess 105 for receiving one or more cables which extend from the solar module. A top wall 109, middle wall 111 and first rear wall 119 form the first recess 103. The second recess 105 is formed by the middle wall 111, a bottom wall 113 and a second rear wall 121. Both the first and second recesses 103 and 105 are open on three sides, with the closed sides being formed by the first rear wall 119 and second rear wall 121, respectively. It is preferred that the cable clip 101 be made from a high impact thermoplastic material such as DynaMix™ 1804-BLK Black UV Stabilized Acetal (DynaMix™ is owned by Polymer Dynamix, LLC, South Plainfield, N.J.), and it is preferred that the thermoplastic material be heat stabilized and UV resistant. However, it is understood that the cable clip 101 may be made of any other type of material while still performing its intended function of clipping onto the edge of a solar module and receiving a cable which extends from the solar module.

Figure 3B:
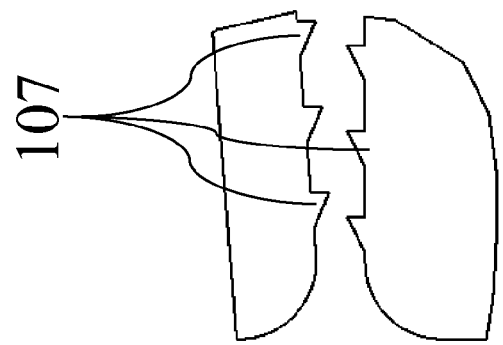
FIG. 3B is a close-up elevation view of the toothed recess of the cable clip for mounting cables onto solar modules of the present invention.
Figure 3A:
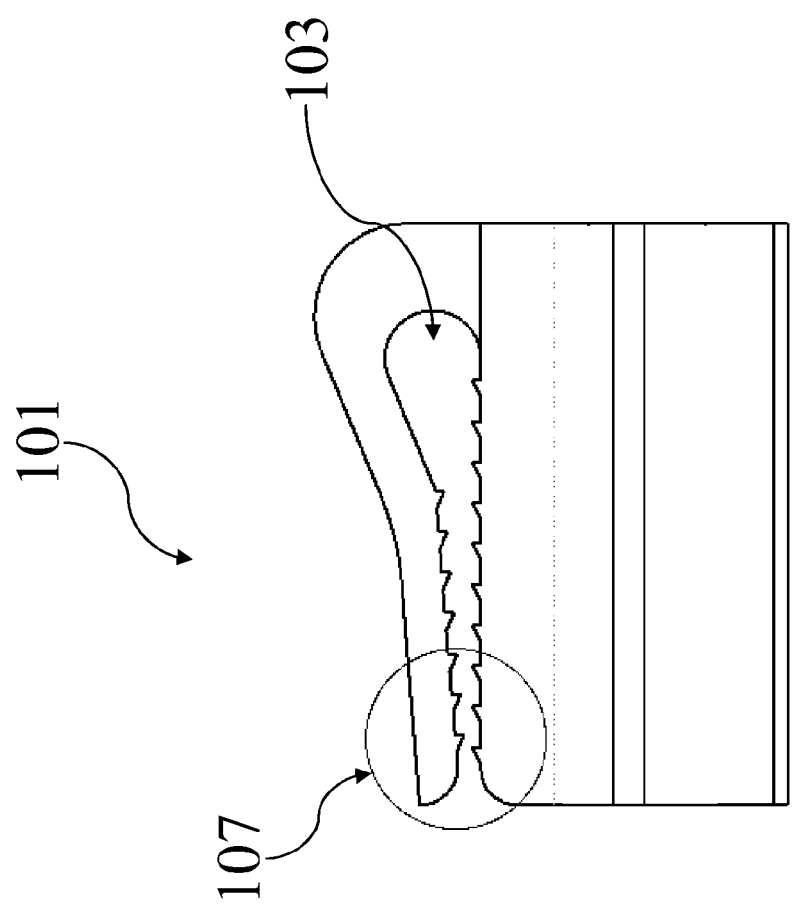
FIG. 3A is an elevation view of a perpendicular configuration cable clip for mounting cables onto solar modules of the present invention.

Shown in FIGS. 3A and 3B is another feature of the cable clip 101. The first recess 103 which clips on to the edge of a solar module is further comprised of teeth 107. These teeth 107 protrude inward towards the first recess 103. The teeth 107 act as a gripping mechanism for the cable clip 101 to prevent the cable clip from slipping off of the edge of the solar module once the cable clip 101 has been installed.

Figure 4:
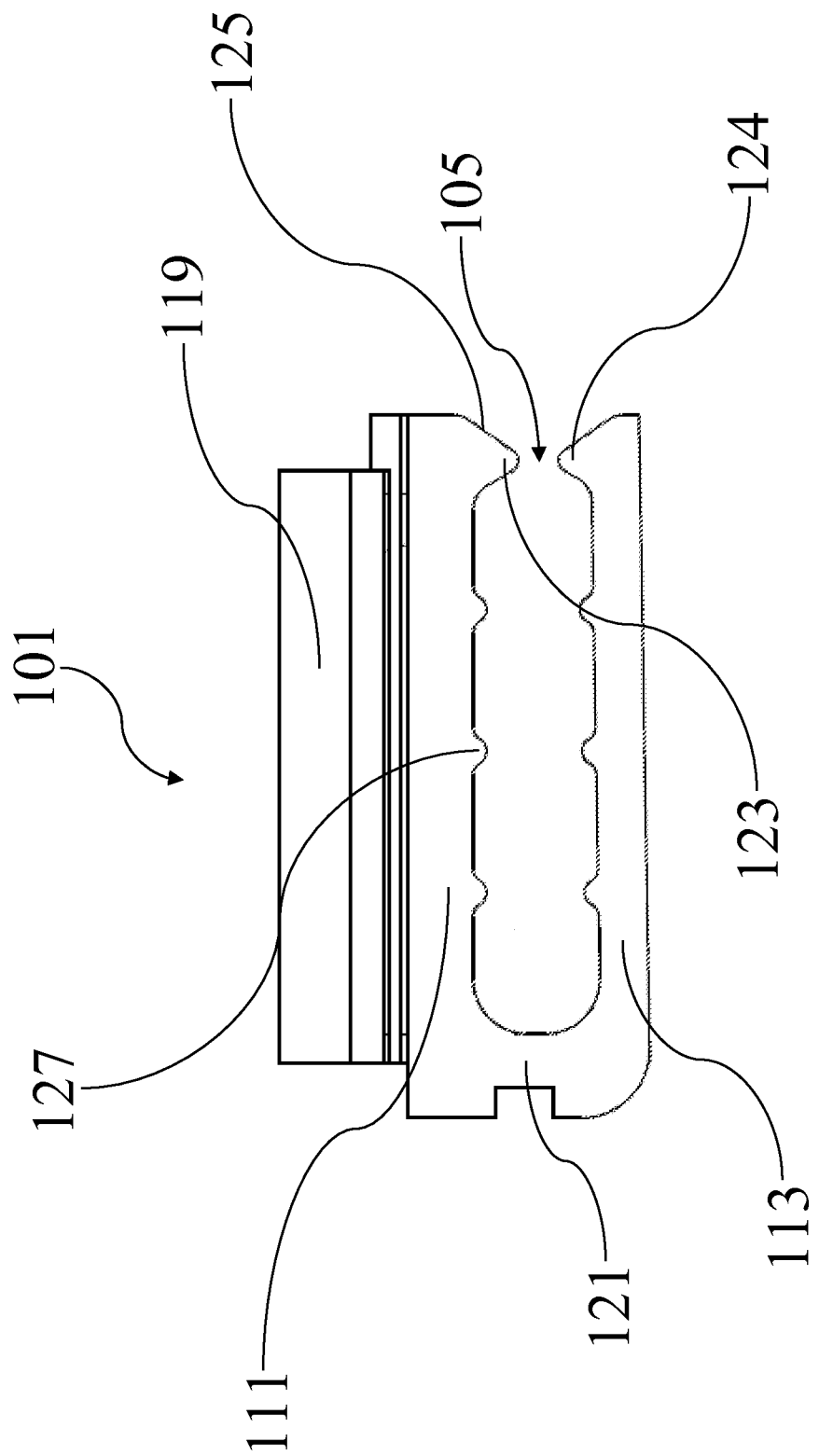
FIG. 4 is an elevation view of a perpendicular configuration cable clip for mounting cables onto solar modules of the present invention.

Shown in FIG. 4 is an elevation view of the cable clip 101 which shows a view looking through the second recess 105 which is the cable receiving portion of the cable clip 101. The middle wall 111 of the cable clip 101 is comprised of a cable restraining lip 123. The cable restraining lip 123 protrudes downward from the edge of the middle wall 111 which is adjacent to the opening of the second recess 105 and opposite the second rear wall 121. Another cable restraining lip 124 protrudes upwards from the edge of the bottom wall 113 and is located directly below the other cable restraining lip 123. Once a cable from a solar module is received by the second recess 105 of the cable clip 101, the cable restraining lips 123 and 124 prevent the cable from sliding out of the second recess 105 and keep the cable securely held in the clip 101. A chamfered entry 125, as shown in FIGS. 2 and 4, which is formed as a part of the middle wall 111 and the bottom wall 113, allows for a cable to be easily inserted into the second recess 105. In addition to the cable restraining lips 123 and 124 which prevent a cable from sliding out of the entry point of the second recess 105 once a cable has been received by the clip 101, there are also cable restraining ribs 127 that help hold cables in position once they are in the clip 101. In FIG. 4, there are six cable restraining ribs shown which form three sets of ribs to keep four cables in place within the clip. However, it is understood that more or less cable restraining ribs could be formed as part of the recess 105 to allow for more or less cables to be held by the clip 101.

Figure 5:
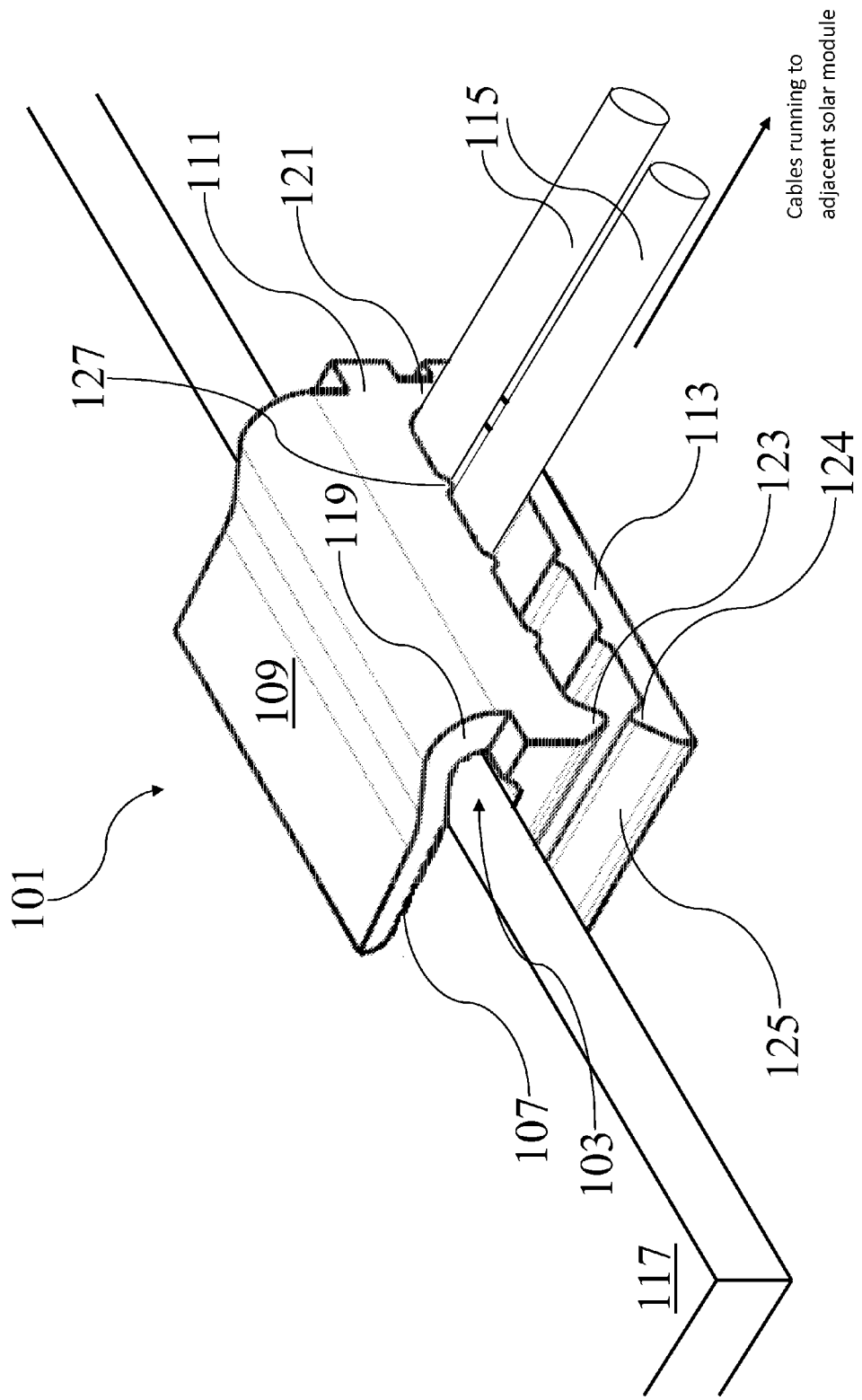
FIG. 5 is a top perspective view of a perpendicular configuration cable clip for mounting cables onto solar modules of the present invention which has been mounted onto a solar module.

Shown in FIG. 5 is a top perspective view of the cable clip 101 mounted on to the edge of a solar module 117 and having received two cables 115. Although two cables 115 are shown as having been received by the clip 101, it is understood that more or less cables may be received by the clip 101. From this figure, it can be seen that the cables 115 run perpendicular to the solar module 117 once the cable clip 101 has been installed on the solar module 117 and the cables 115 have been received by the cable clip 101. It can also be seen from this figure that the teeth 107 of the first recess 103 keep the cable clip in place on the edge of the solar module 117 by engaging with the edge of the solar module 117. This arrangement of the cables 115 when clipped to a side edge of the solar module 117 is preferred by installers when the cables 115 must be run to the adjacent solar module to connect to it in order for a series of solar modules to be connected. Another advantage to the clip 101 is that because the first recess 103 of the clip 101 is open on three sides, this allows the clip 101 to have the ability to slide along the edge of the solar module 117 even after the clip 101 has received the cables 115 and been mounted onto the solar module 117. This is useful for an installer if an installer desires to reposition the cable or cables after installation onto the solar module for adjustment of the cable or cables with respect to the clipped position on the solar module. Use of the cable clip 101 also prevents installers from having to drill holes into the frames of framed solar modules to loop the cable through for solar modules that do not have existing mounting holes for cables, which saves installers valuable time when installing a series of solar modules. Alternatively, if drilled holes are used instead of a cable clip, then an installer does not have the option of repositioning the cable with respect to the solar module unless the installer drills another hole. Lastly, the cable clip 101 is less expensive to produce, as it is a one-piece assembly, unlike some existing cable clips which are composed of multiple parts, such as a clip with an attached cable tie.

In FIGS. 1-5, a cable clip is shown which has a perpendicular configuration, meaning that the toothed first recess 103 is perpendicular with respect to the second recess 105 which accepts one or more cables 115 from a solar module 117. This perpendicular configuration is helpful when the cable clip 101 can be clipped to the side edge of a solar module 117 for the cables to run from one module to the next, but if there is no other option but to clip the cable clip 101 to either the top or bottom edge of the solar module, then the perpendicular configuration may not be very helpful, as this would result in the cables not running in the direction of the adjacent solar module that they need to connect to. For this reason, a parallel configuration of the cable clip is also needed. This parallel configuration cable clip 128 can be seen in FIGS. 6-8. As with the perpendicular configuration cable clip 101 shown in FIGS. 1-5, the same attributes and features shown in those figures remain in the parallel configuration cable clip 128 shown in FIGS. 6-8. FIGS. 6 and 7 show the first toothed recess 103, the second recess 105 for holding the cables, the cable restraining lips 123 and 124, the chamfered entry 125 for ease of entry of a cable into the second recess 105 and the cable restraining ribs 127 which hold the cables in place.

Figure 8:
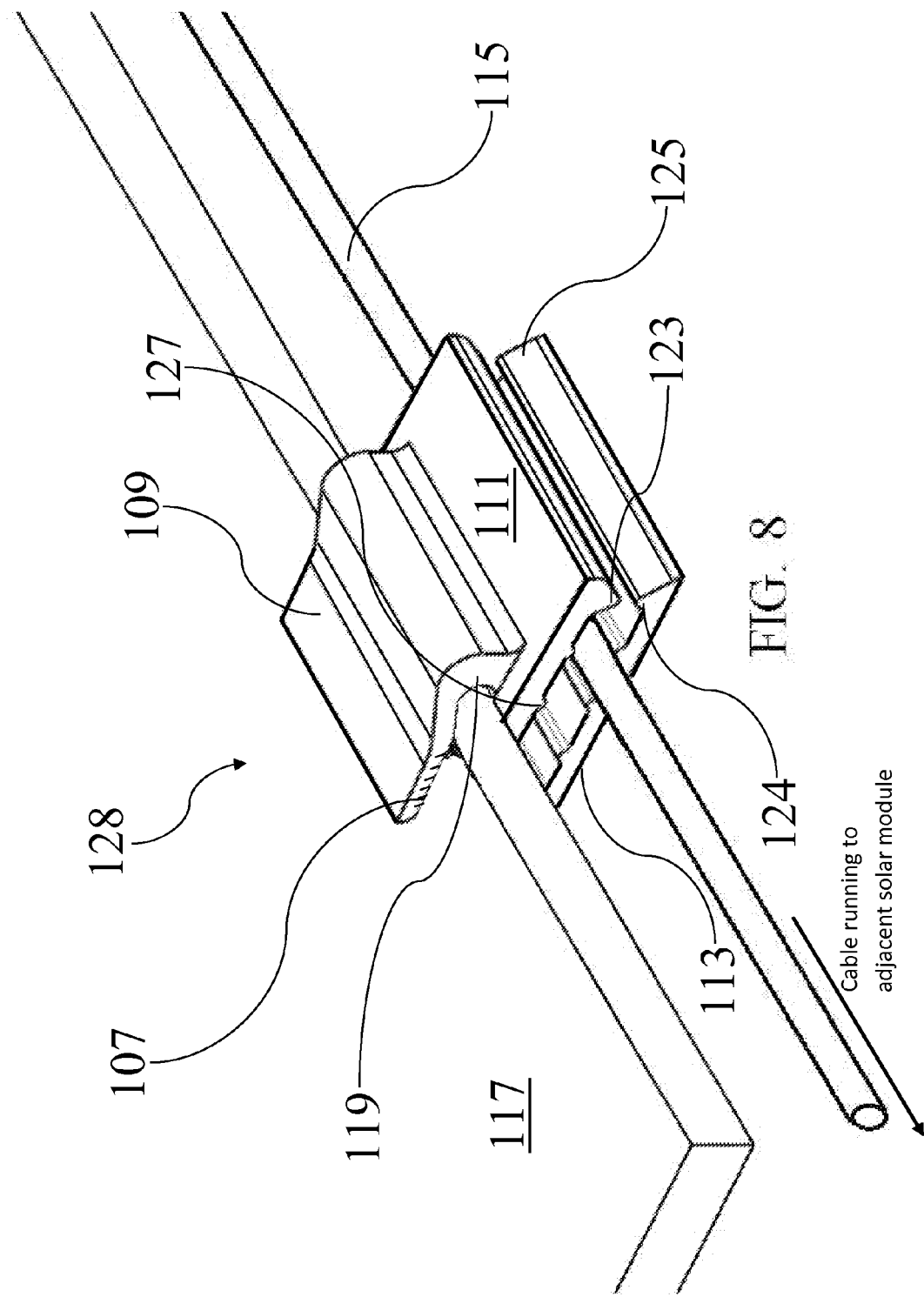
FIG. 8 is a top perspective view of a parallel configuration cable clip for mounting cables onto solar modules of the present invention which has been mounted onto a solar module.

FIG. 8 shows the different arrangement of the cable 115 that results from the parallel configuration cable clip 128 as compared to the perpendicular configuration cable clip 101 shown in FIGS. 1-5. In FIG. 8, only one cable 115 is shown, whereas in FIG. 5 two cables are shown. However, it is understood that the cable clip, regardless of being perpendicular or parallel in configuration, may contain one or more cables, depending on how many cables need to be strung from one solar module to the next. In FIG. 8, again the same features of the parallel configuration cable clip 128 are shown as can be seen in FIGS. 1-5. In FIG. 8, it can be seen that in this arrangement, the clip 128 has been clipped onto either the top or bottom edge of a solar module 117, which allows for the cable 115 to be mounted so that it runs in the direction of the next adjacent solar module. The choice of a perpendicular configuration cable clip 101 as shown in FIGS. 1-5 or a parallel configuration cable clip 128 as shown in FIGS. 6-8 gives installers of solar modules maximum flexibility to choose the arrangement of cable mounting that is most convenient to them for a particular installation project.

Lastly, shown in FIGS. 9 and 10 is a multi-level cable clip 130 with the same features and attributes as shown in the cable clips of FIGS. 1-8. In FIGS. 9 and 10, the cable clip 130 shown is of a parallel configuration as in FIGS. 6-8. However, it is understood that the multi-level cable clip 130 of FIGS. 9 and 10 could also be of the perpendicular configuration shown in FIGS. 1-5. The multi-level cable clip 130 shown in FIGS. 9 and 10 can contain more cables than the cable clips shown in FIGS. 1-8 because it has two recesses 105 formed as a part of the clip 130 for accepting cables. The multi-level cable clip 130 may be useful to installers when they have a solar module which has many cables that need to be strung to an adjacent module, or the multi-level clip 130 may be useful for a solar module that serves as a junction point where multiple cables from other modules meet and need to be clipped onto a solar module. Although in FIGS. 9 and 10 the cable clip 130 shown has two recesses 105 for holding a plurality of cables, it is understood that more than two recesses for receiving cables could be used.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A cable clip for mounting at least one cable onto a solar module, the cable clip comprising:
    a single top wall, a middle wall, and a single bottom wall;
    wherein the top wall and middle wall are connected by a first rear wall to form a first recess which is open on three sides;
    wherein the middle wall and bottom wall are connected by a second rear wall to form exactly one second recess which is open on three sides, the second recess extending a length of the first rear wall;
    wherein the first rear wall of the first recess and the second rear wall of the second recess are perpendicular to one another such that the first recess and the second recess are oriented perpendicular to one another and such that the first recess opens towards a first plane and the second recess opens towards a second plane perpendicular the first plane; and
    wherein the first recess receives an edge of the solar module and the second recess receives at least one cable which extends from the solar module.

2. The cable clip of claim 1, wherein the first recess is further comprised of teeth for gripping and engaging onto the edge of the solar module.

3. The cable clip of claim 1, wherein the cable clip further comprises a cable restraining lip which protrudes downward from an edge of the middle wall adjacent to the open side of the second recess which is opposite the second rear wall for restraining a cable which has been received by the second recess and a second cable restraining lip which protrudes upward from an edge of the bottom wall adjacent to the open side of the second recess which is opposite the second rear wall for restraining a cable which has been received by the second recess,
    wherein the second cable restraining lip which is protruding upwards from the edge of the bottom wall is located directly below the cable restraining lip which protrudes downward from the edge of the middle wall.

4. The cable clip of claim 1, wherein the open side of the second recess which is opposite the second rear wall has a chamfered entry extending symmetrically upwards from the bottom wall and downwards from the middle wall that allows for easy insertion of the cable into the second recess of the cable clip.

5. The cable clip of claim 1, wherein the cable clip is comprised of a high impact thermoplastic material, the high-impact thermoplastic being heat stabilized and UV resistant.

6. The cable clip of claim 1, wherein the cable clip is a one-piece assembly.

7. The cable clip of claim 1, wherein the cable clip is able to slide along the edge of the solar module if an installer desires to reposition the cable after installation onto the solar module for adjustment of the cable with respect to its clipped position on the solar module.

8. The cable clip of claim 1, wherein the second recess which receives the cable is further comprised of a plurality of cable restraining ribs which hold the cable in position within the second recess once it has been received by the clip, each cable restraining rib being a member of a pair of cable restraining ribs.

9. The cable clip of claim 8, wherein the plurality of cable restraining ribs number exactly six forming three pairs of ribs.

10. A cable clip for mounting at least one cable onto a solar module, the cable clip comprising:
    a single top wall, a middle wall, and a single bottom wall;
    wherein the top wall and middle wall are connected by a first rear wall to form a first recess which is open on three sides;
    wherein the middle wall and bottom wall are connected by a second rear wall to form exactly one second recess which is open on three sides, the second recess extending a length of the middle wall;
    wherein the first rear wall of the first recess and the second rear wall of the second recess are parallel to one another such that the first recess and the second recess are oriented parallel to one another in opposing directions and such that the first recess opens towards a first plane and the second recess opens towards a second plane parallel the first plane; and
    wherein the first recess receives an edge of the solar module and the second recess receives at least one cable which extends from the solar module.

11. The cable clip of claim 10, wherein the first recess is further comprised of teeth for gripping and engaging onto the edge of the solar module.

12. The cable clip of claim 10, wherein the cable clip further comprises a cable restraining lip which protrudes downward from an edge of the middle wall adjacent to the open side of the second recess which is opposite the second rear wall for restraining a cable which has been received by the second recess and a second cable restraining lip which protrudes upward from an edge of the bottom wall adjacent to the open side of the second recess which is opposite the second rear wall for restraining a cable which has been received by the second recess,
    wherein the second cable restraining lip which is protruding upwards from the edge of the bottom wall is located directly below the cable restraining lip which protrudes downwards from the edge of the middle wall.

13. The cable clip of claim 10, wherein the open side of the second recess which is opposite the second rear wall has a chamfered entry extending symmetrically upwards from the bottom wall and downwards from the middle wall that allows for easy insertion of the cable into the second recess of the cable clip.

14. The cable clip of claim 10, wherein the cable clip is comprised of a high impact thermoplastic material, the high-impact thermoplastic being heat stabilized and UV resistant.

15. The cable clip of claim 10, wherein the cable clip is a one piece assembly.

16. The cable clip of claim 10, wherein the cable clip is able to slide along the edge of the solar module if an installer desires to reposition the cable after installation onto the solar module for adjustment of the cable with respect to its clipped position on the solar module.

17. The cable clip of claim 10, wherein the second recess which receives the cable is further comprised of a plurality of cable restraining ribs which hold the cable in position within the second recess once it has been received by the clip, each cable restraining rib being a member of a pair of cable restraining ribs.

18. The cable clip of claim 17, wherein the plurality of cable restraining ribs number exactly six forming three pairs of ribs.

19. A cable clip for mounting at least one cable onto a solar module, the cable clip comprising:
    a top wall, a first middle wall, a second middle wall, and a bottom wall;
    wherein the top wall and first middle wall are connected by a first rear wall to form a first recess which is open on three sides;

wherein the first middle wall and second middle wall are connected by a second rear wall to form a second recess which is open on three sides;

wherein the second middle wall and bottom wall are also connected by the second rear wall to form a third recess which is open on three sides;

wherein the first recess receives an edge of the solar module and the second and third recesses can receive a plurality of cables which extend from the solar module;

wherein the cable clip is a one-piece assembly;

wherein the first recess is further comprised of teeth for gripping and engaging onto the edge of the solar module; and wherein the first rear wall of the first recess and the second rear wall of the second and third recesses are arranged perpendicular to one another and such that the first recess opens towards a first plane and the second recess and the third recess open towards a second plane perpendicular the first plane.

20. The cable clip of claim 19, wherein the second and third recesses which receive the plurality of cables are further comprised of a plurality of cable restraining ribs which hold the cables in position within the second and third recesses once they have been received by the clip, each cable restraining rib being a member of a pair of cable restraining ribs.

21. The cable clip of claim 19, wherein the open sides of the second and third recesses which are opposite the second rear wall each have a chamfered entry extending symmetrically that allows for easy insertion of the plurality of cables into the second and third recesses of the cable clip, the chamfered entries of the second and third recesses extending an equal distance from the second rear wall.

* * * * *